US010601808B1

(12) United States Patent
Nijim et al.

(10) Patent No.: US 10,601,808 B1
(45) Date of Patent: Mar. 24, 2020

(54) SINGLE SIGN-IN ACROSS LINKS/URLS WHILE WATCHING PROGRAMS

(71) Applicant: Cox Communications, Inc., Atlanta, GA (US)

(72) Inventors: Yousef Wasef Nijim, Roswell, GA (US); James Alan Strothmann, Johns Creek, GA (US); Jay Paul Langa, Cumming, GA (US)

(73) Assignee: COX COMMUNICATIONS, INC, Atlanta, GA (US)

( * ) Notice: Subject to any disclaimer, the term of this patent is extended or adjusted under 35 U.S.C. 154(b) by 0 days.

(21) Appl. No.: 14/320,070

(22) Filed: Jun. 30, 2014

(51) Int. Cl.
*H04L 29/06* (2006.01)

(52) U.S. Cl.
CPC .............................. *H04L 63/0815* (2013.01)

(58) Field of Classification Search
CPC .................................................. H04L 63/0815
See application file for complete search history.

(56) References Cited

U.S. PATENT DOCUMENTS

| 8,196,177 B2* | 6/2012 | Hinton, I | G06F 21/10 726/1 |
| 8,756,624 B2* | 6/2014 | Blommaert | H04L 63/0815 380/201 |
| 9,692,747 B2* | 6/2017 | Bailey | G06F 21/41 |
| 2006/0230145 A1* | 10/2006 | Zarakhovsky | G06F 21/10 709/225 |
| 2011/0166918 A1* | 7/2011 | Allaire | G06Q 30/0239 705/14.7 |
| 2012/0008786 A1* | 1/2012 | Cronk | H04L 63/102 380/282 |
| 2013/0191929 A1* | 7/2013 | Yin | G06F 21/31 726/28 |
| 2014/0282851 A1 | 9/2014 | Miller et al. | |
| 2014/0289530 A1* | 9/2014 | De Waal | H04L 63/08 713/171 |
| 2015/0161578 A1* | 6/2015 | Ahmed | G07F 17/24 705/40 |
| 2015/0244696 A1* | 8/2015 | Ma | H04L 63/08 726/4 |

OTHER PUBLICATIONS

Lockhart et al, Security Assertion Markup Language (SAML) V2.0 Technical Overview, Sep. 12, 2005, Oasis, 51 Pages.*

* cited by examiner

*Primary Examiner* — Christopher C Harris
(74) *Attorney, Agent, or Firm* — Merchant & Gould

(57) ABSTRACT

Single sign-in for accessing protected content across all providers and access channels is provided. When a user selects to view an additional content item, a determination may be made whether access authentication from the requesting user is required. If access authentication is required, a federated login credential may be received from the requesting user. The federated login credential may be used for granting access by the requesting user to the selected additional content item across different content channels, and the federated login credential may be used for granting access by the requesting user to other protected content items without requiring additional access authentication from the requesting user.

20 Claims, 5 Drawing Sheets

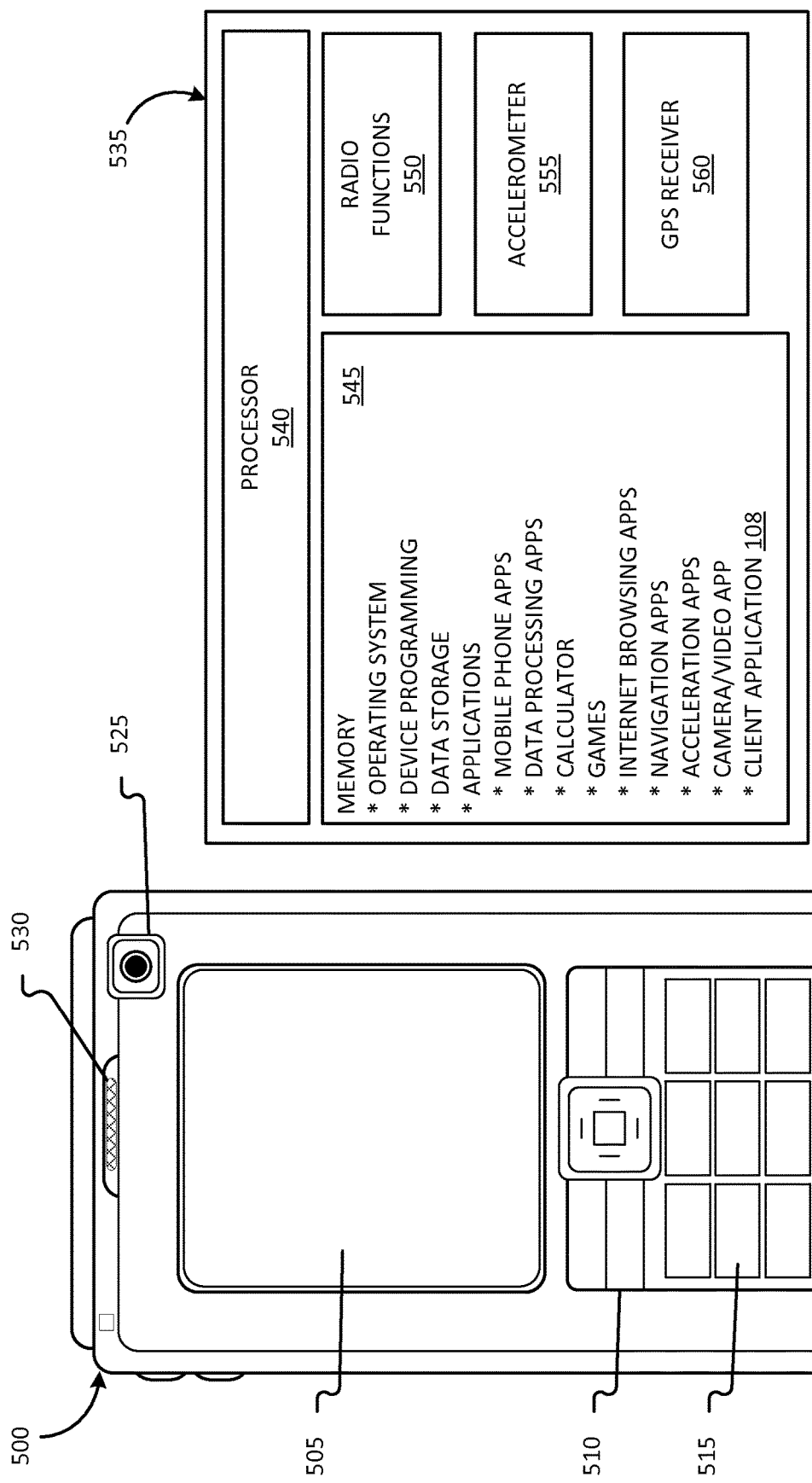

SINGLE SIGN-IN ACROSS LINKS/URLS WHILE WATCHING PROGRAMS

BACKGROUND

While viewing video content items, consumers may wish to view related additional content items. For example, the consumer may want to view additional content relating to the subject matter of being viewed content item, a particular actor/actress in the content item, or some other aspect of the content item. Further, some of the additional content items may be protected, which may require a user authentication (e.g., user identification and password) to be entered for access. In such a situation, the consumer may typically be required to utilize another device, such as a computer or mobile computing device, to navigate to a web page to perform a search for the additional content. Further, in some cases, the consumer may browse through search results to find additional content that is related to the "being viewed" content item and/or of interest to the consumer. Some of the additional content items may be freely available while others may be restricted or protected additional content.

Once the consumer locates the additional content item(s) that he/she may wish to access, if the additional content is protected, the user may have to enter his/her user identification and/or password. If he/she has not previously provided such authentication information for the website or other content repository from which the additional content will be obtained, the user may have to complete a registration process. Frequently, users may have several different user identifications and/or passwords for each of the various websites or other content repositories from which additional content may be obtained. Completing a registration process for each site and/or remembering authentication information previously provided may be time consuming, tedious and distracting from the user experience of viewing the desired video content and any desired additional content.

It is with respect to these and other considerations that the present invention has been made.

SUMMARY

Embodiments of the present invention provide a single sign-in process for accessing protected content across all providers within various video applications. Providing user access to additional content via a seamless single sign-in process improves user experience by allowing a user to access additional content from a variety of websites and content repositories as they switch from one channel to another channel.

When a user selects to view an additional content item while viewing the video content item, the system may perform a check to determine if the additional content items are protected or not. Once the additional content items may be identified as protected content items, the system may further perform a check to determine if the user has credentials for accessing the protected additional content items. If the user does not have credentials, the system may allow access by obtaining federated credentials (previously established by the user) that may be used to allow the user access to additional content items across a variety of websites or other content repositories. This provides the user with seamless access to protected additional content without going through the hassle of entering their credentials every time they switch from one channel to another.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention.

BRIEF DESCRIPTION OF THE DRAWINGS

FIGS. 5A and 5B illustrate a suitable mobile computing environment with which embodiments may be practiced.

DETAILED DESCRIPTION

Figure 1:
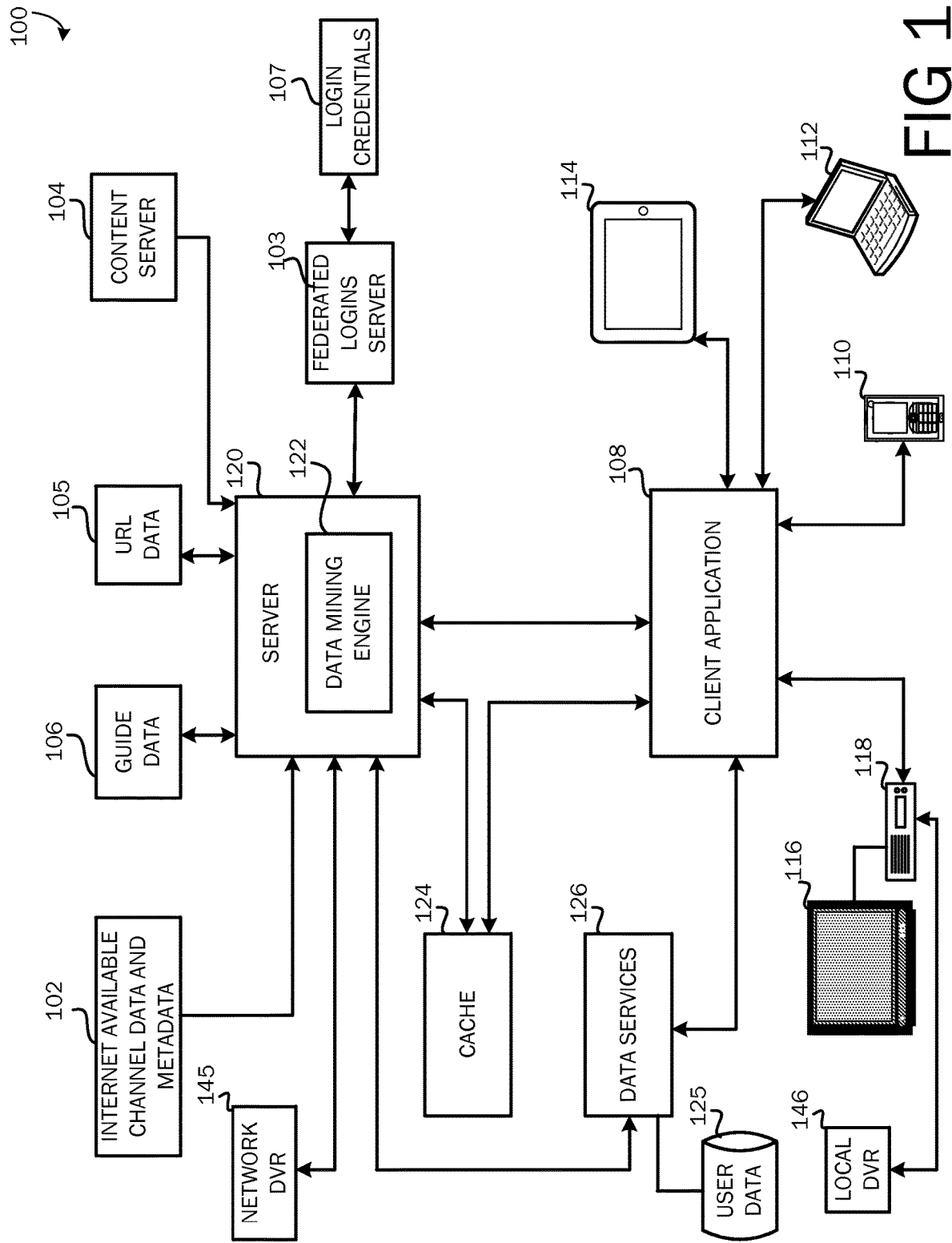
FIG. 1 is a simplified block diagram of a system for providing single sign-in for accessing protected content across all providers within video applications.

As briefly described above, embodiments provide single sign-in for accessing protected content across all providers within video applications. While viewing video content, if a user selects to view an additional content item, a check may be performed to identify if the requested additional content item is protected or freely accessible. A check may be performed to determine if the requesting user has credentials for accessing the protected additional content items. If the user does not have credentials, the access may be authorized by obtaining previously established federated credentials for the requesting user.

According embodiments, content customers may access the links to or uniform resource locators (URLs) or certain programs or channels for protected content using single sign-in across all providers. The single sign-in login will be federated across all programs and channels. For example, if a customer is watching program1 on channel X and the customer is trying to access a link to an additional content item (e.g., a program or video referenced by the program1 available from an Internet website) via a content viewing guide or other user interface, the customer either will be challenged once to enter user authentication information (e.g., user identification (ID) and password) which will allow the customer to access the desired content via other channels (e.g., Channel Y) with the same credentials without the need to re-enter the user ID and/or password. The parental control settings will still apply when the user is accessing the links based on the parental control settings for that particular user. When the customer tunes from one channel to another, the sign-in credentials will automatically get updated to reflect the content owner credentials. The sign-in information will remain the same although the content owner channel credentials change.

Additionally, some programs on certain channels are aggregated from different providers. The credentials will be carried on playback. The playback may trigger a mechanism to reflect that protected content over websites requires a user ID and/or password. According to embodiments, when such a requirement for user authentication is triggered, a request for user ID and/or password may be sent to the back office of the user/customer's service provider or may be processed on the client side (e.g., at a set top box or other computing device operable for providing user access to content) where passing the User ID and/or password will occur to allow the customer to access the protected content from the associated websites or other content repositories seamlessly. If the content is not protected and may be accessed without credentials and/or charge, there is no need to pass the credentials to the new content owner website, but the parental controls and other settings may be passed either per user or device to the website or other repository for restricting the content access based on the parental control settings.

These embodiments may be combined, other embodiments may be utilized, and structural changes may be made without departing from the spirit or scope of the present invention. Referring now to the drawings, in which like numerals refer to like elements throughout the several figures, embodiments of the present invention and an exemplary operating environment will be described.

FIG. 1 is a block diagram of a system 100 for providing single sign-in for accessing protected content across all providers within video applications, as described above. Components of the system 100 may operate as a distributed system where each component is accessed via a suitable network, or the components may operate together as an integrated system. As illustrated, Internet-available channel data and metadata 102, content server 104, guide data 106 and URL data 105 may be provided. For example, Internet-available channel data and metadata 102 may include video content data and metadata available on the Internet, such as YouTube®, Hulu®, etc.

Content server 104 may include video content data and metadata available via a service provider, such as cable television (CATV) services system (as illustrated and described below with reference to FIG. 3), satellite television provider, etc. provided by the content owners/providers. The data and metadata may include information such as video content title, storyline, cast, genre, rating, release date, images, etc. Guide data 106 may include channel information, programming information, network information, etc.

Federated Logins server 103 may also be provided. Federated Logins server 103 may include federated logins created for each user. According to an embodiment, the federated login may either be a generic login, which may be used for free protected content; or a more complex login that may be used for paid content. For example, when the user creates the federated login in that subsequently may be used for accessing additional content as described herein, a generic login comprised of a user ID and password may be provided that may be matched against access information for a requesting user. On the other hand, when the user is generating the federated login, he/she may provide payment information such as a credit card number that may be used for automatically paying for a fee-based additional content item when access to such an item is requested. Embodiments may provide for a unique federated login for each user profile within a household account. For example, if there are four members with individual user profiles in a household, there may be four unique federated login credentials created for each user profile. When the user profile changes, the associated federated login credentials may also change. This may further personalize user experience.

According to embodiments, one or more users may provide a single login ID and/or password that is stored in the Federated Logins server 103 that may be obtained and used for user access authentication to any content provider who agrees to use of the federated login for the user. For example, for a given content (e.g., television) services provider, a user may provide a single login ID and/or password, and the services provider may automatically provide the single login ID and/or password to any content provider requiring user authentication. Thus, when a user attempts access to protected content, the client application 108, described below, may intercept a request by the provider of the protected content and provide the federated single sign-in ID and/or password so that access may be obtained without interrupting the user's experience of seamlessly accessing the desired protected content.

According to an embodiment, if there are parental controls associated with a user profile, the federated login credential may be created in compliance with the parental control settings that are in place. For example, if a user does not have privileges to view a content item, he/she may not have access to view additional content associated with or referenced by/via the being-viewed content which may not comply with the parental controls setting.

URL data 105 may include interactive content or pointers to the interactive content on the internet associated with the content. The update of the additional interactive content associated with the video content items may be based on time, which may be triggered at a specific point of time in the video content; based on content and additional content available; based on user behavior i.e. the manner in which the user consumes the video content and the additional content or video content being played; and/or may be based on action by the user or the service provider, i.e. when the user switches to a particular video content, etc.

Local DVR 146 may be provided that may store DVR recordings locally while recording from a TV 116 connected to a set-top box 118. Network DVR 145 may also be provided that may store the DVR recordings on an IP network when recording from an IP enabled devices 110, 112,114.

The Internet-available channel data and metadata 102, content server 104, guide data 106, and URL data 105 may be provided to a server 120 where a data mining engine 122 may be operable to analyze and sort the data and metadata, associated URL data and metadata 105, and associate the channel data and metadata 102, with the guide data 106. The URL data 105 may be hidden or may be displayed to the user.

The associated channel/guide data may be cached. The cache 124 is illustrated in FIG. 1 as a remote element, but may be integrated with the server 120 or the client application 108. As new information becomes available, the associated channel/guide data may be updated in the cache 124.

According to one embodiment, the cached associated channel/guide data may be specific to a user profile. The system 100 may include a data services system 126 which may comprise such information as billing data, permissions and authorization data, user profile data, etc., and its data may be stored in a user database 125. The data services system 126 may be accessed by the data mining engine 122 for checking permissions, subscriptions, and profile data for associating channel and guide data to specific users.

As illustrated in FIG. 1, various endpoint devices may be utilized to access video content that can leverage HTML or web technologies to display video content with additional interactive content. Embodiments of the present invention may be applied to any video decoding display device that can run an associated Internet browser as part of the user interface application layer. For example, endpoint devices may include, but are not limited to, a mobile communication device 110, such as a mobile phone, a computing device 112, such as a desktop computer, a laptop computer, etc., a wireless computing device, such as a tablet computing device 114, a television 116, such as an Internet-connected television or a television connected to a network-connected device, such as a set top box (STB) 118. An endpoint device 110,112,114,116 may be utilized to access a client application 108.

The client application 108 may be operable to receive a request from a user for accessing an additional content item that may be associated with a video content item. A determination may be made if the additional content item is protected content that requires credentials for access. If the requested additional content item is protected, then another determination may be made, if the user has credentials to access the protected content item and has provided them to the system previously. Such credentials may be stored in a login credentials server 107.

If the client application 108 does not identify any credentials data for the requesting user in the login credentials server 107, it may obtain a federated login credential from the Federated Logins server 103 to enable the client application to access the protected content item seamlessly. That is, the federated login credentials may be stored in and obtained via Federated Logins server 103.

Additional content associated with a URL or link from URL data 105 with a video service may then be displayed and rendered on a TV screen (or other display devices), in conjunction with the video service.

According to an embodiment, service providers may manage the additional protected content described herein based on various business rules/agreements in place with the users, content providers/owners, CE manufactures, etc. According to an embodiment, targeted advertisements may also be presented since the system has viewing data on the user.

Further, embodiments may allow the user to access the additional content based on the user's desire. For example, user may be able watch the additional content in a video pane where he may be able to choose to hear the additional content by selecting the video pane or the user may just be able to see the additional content while hearing the "being viewed" video content.

Figure 2:
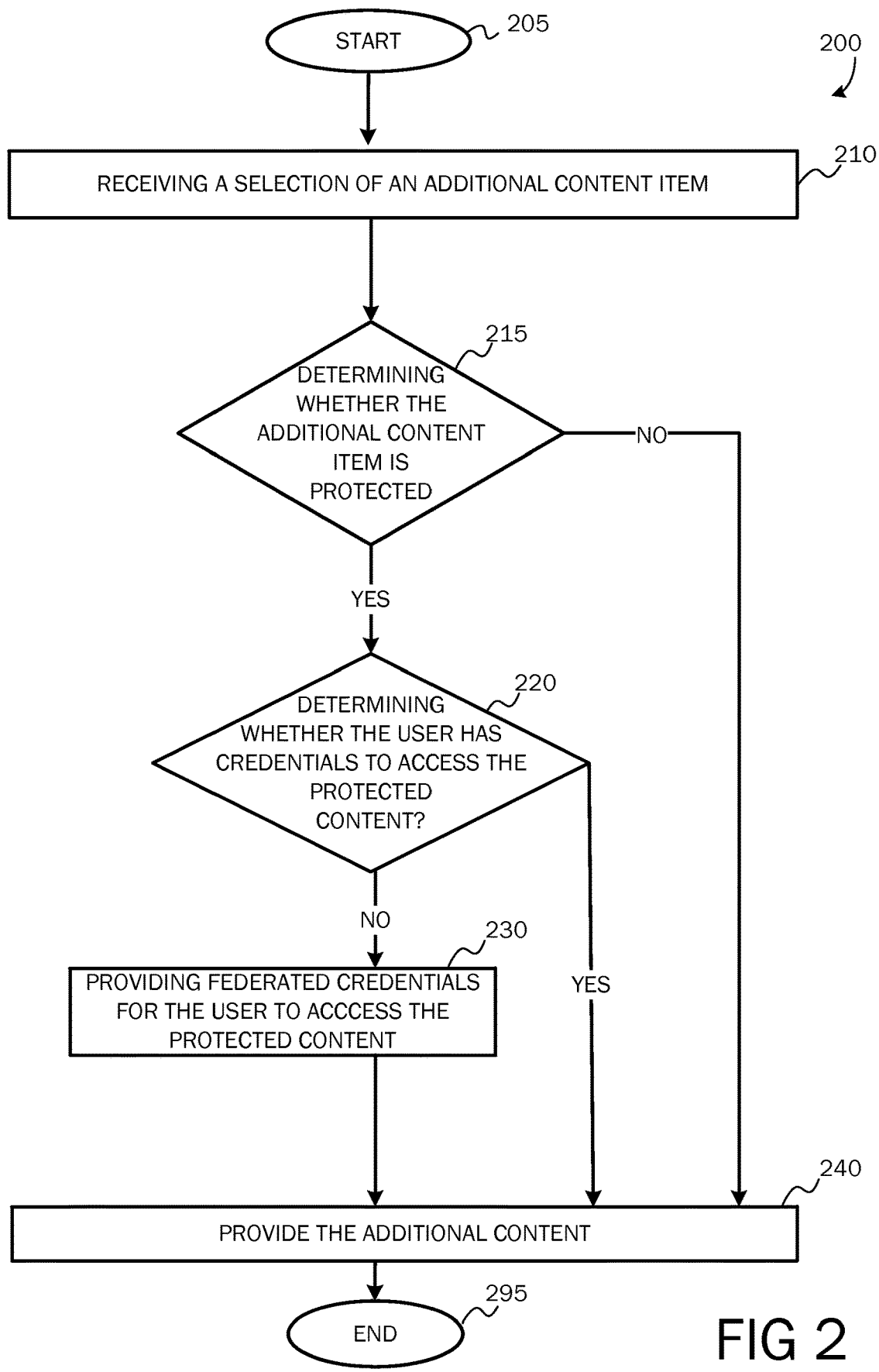
FIG. 2 is a flow chart of a method for providing single sign-in for accessing protected content across all providers within video applications.

FIG. 2 is a flow chart of a method 200 for providing single sign-in to access protected content across all providers and channels within video applications. The method 200 starts at OPERATION 205 and proceeds to OPERATION 210 where the system 100 may receive an indication of selection of an additional content item. For example, a user may be consuming a favorite television show on channel X via his/her television services provider. A link may be provided via a user interface (e.g., a television viewing guide) for accessing additional content that may be of interest to the user in association with the being-viewed content. For example, a linked video or product offering (that may or may not require paying a fee for accessing or obtaining) may be referenced by or associated with the being-viewed television show. If the user desires to access the linked content (e.g., via an Internet website), a determination may be required as to whether user authentication is required for accessing and/or paying for the additional content. According to embodiments described herein, it will be advantageous to the user's experience to dispose of the access authentication/credentials requirement via a single sign-in or login so that the user's access to protected content will be authorized as the user switches from channel to channel unless some other access denial property such as a parental control is in place that otherwise restricts access to the requesting user.

The method 200 proceeds to a DECISION OPERATION 215, where a determination may be made if the additional content item is protected or freely available. According to one embodiment, determining if the additional content item requires access authentication from a requesting user includes parsing a metadata associated with the additional content item to determine whether access authentication is required from a requesting user prior to allowing access to the additional content item. As should be appreciated, a provider of a given content item may include metadata with the content item that provides various information items about the content item, for example, production information, plot information, information on actors/actresses, genre information, and the like. In addition, if access to the content item is restricted in any manner requiring access authentication from a requesting user, such access restrictions may be included in the metadata for causing any application attempting access to the content item to require access authentication credentials before access may be granted. If it is determined at DECISION OPERATION 215, that the requested additional content item is not protected and is freely available, the method 200 proceeds to OPERATION 240, where the additional content may be presented to the user's viewing device. The method 200 may then end at OPERATION 295.

Alternatively, if at DECISION OPERATION 215, it is determined that the requested additional content item is protected, the method 200 proceeds to yet another DECISION OPERATION 220, where a determination may be made if the user has the credentials to access the additional content item. According to an embodiment, user credentials for one or more associated websites or other content repositories may be entered, as a setup procedure, prior to accessing the video content item or as and when desired by the user. Alternatively, According to one embodiment, the first time the user attempts access to a protected content item requiring access authentication, the user may be presented with a user interface component that asks the user for credentials input such as a user ID and password. If the user has not previously provided such credentials, then other information may be required such as payment information (e.g., credit card number) for content items requiring payment as well as other identifying information such as full name, address, service provider information, etc. As described above, when a federated login credential is requested for granting user access to a given content item the login credential may include a generic login credential comprised of a user ID and/or password for accessing a protected additional content item requiring no payment or a complex login credential comprised of a user ID and/or password and including payment information for accessing a protected additional content item requiring payment. Once entered, such credentials may be stored in the Federated Logins server 103 for future recall when the user attempts access to a content item requiring access authentication.

If at DECISION OPERATION 220, it is determined that the user does not have the credentials to access the additional content item, the method 200 proceeds to OPERATION 230, where the system 100 may obtain federated login credentials for the user which allows the user to access the protected additional content items seamlessly without the need for entering their credentials, every time they change channels and try to access protected additional content items associated with the video content items. Referring still to FIG. 2, after the appropriate federated login credentials are entered and/or retrieved, the method 200 proceeds to OPERATION 240, where the requested additional content may be presented to the user's viewing device. As should be appreciated, if access to the requested content item is restricted based on some other restriction property, for example, a parental control property set on the requested content item, then access to the content item by the requesting user may still be prevented until an appropriate access control input is received, for example, a release of a parental control property.

According to embodiments, once federated login credentials are entered and/or retrieved for a requesting user, access by the requesting user may be automatically granted for other protected content items and/or when the user switches to a different viewing channel without requiring additional access authentication from the user. That is, if a subsequent selection of the additional content item is received via a second viewing tuning channel, then the federated login credential may automatically be provided for the requesting user for accessing the additional content item via the second viewing tuning channel without requiring additional login credentials from the requesting user. Similarly, if a second additional content item that is protected from access is selected by the requesting user, then the stored federated login credential automatically may be provided to a provider of the second additional content item for allowing the requesting user access to the second additional content item.

Embodiments may maintain a virtual list of websites or other content repositories (e.g., content services providers accessible from the user's services provider for obtaining selected content items) with protected additional content items that the user may be accessing. The federated login credentials may allow access to all the websites with protected additional content within the list. As more websites or other content repositories with protected additional content may be accessed by the user, they may be added to the virtual list.

Further, according to an embodiment, if the user has a secondary device, the system 100 may be able to detect the secondary device, with the user's authorization, and present the corresponding UI modules to provide an option to the user to direct the requested additional content to the secondary device for viewing.

Embodiments may also provide for the user to get back to the original video content item, once the user is finished accessing the additional protected content. If the being-viewed content is a nonlinear (e.g., recorded content), the user may be able to get back to the same viewing point from which the user may have initiated the access of the additional protected content item.

The method 200 ends at OPERATION 295.

According to an embodiment, the protected additional content may be presented or hidden based on factors such as user profile, credentials, or parental control settings. For example, if a user does not have access to watch HBO®, or HBO Go® (e.g., online streaming website), the protected additional content may be hidden or a link/URL with an advertisement where HBO Go® may be offered for free may be presented. Other content such as trailers, promotions, etc. may also be presented.

According to another embodiment, the protected additional content may be presented to the user based on the user's entitlements to the protected content itself. This may be analyzed independently from their entitlements to view the video content item itself. For example, a young user, limited to PG-rated content, may not be able to view an R-rated video content item due to parental controls settings. If the protected additional content that may be associated with the R-rated video content item is PG-rated, the user may be allowed access to the protected additional content item via the federated login created for the user, in spite of having no credentials to view the actual video content item being presented. Further, embodiments may provide for the presentation of the protected additional content items based on a correlation between the parental control settings provided by the user to the service provider and the provider of the protected additional content item.

Figure 3:
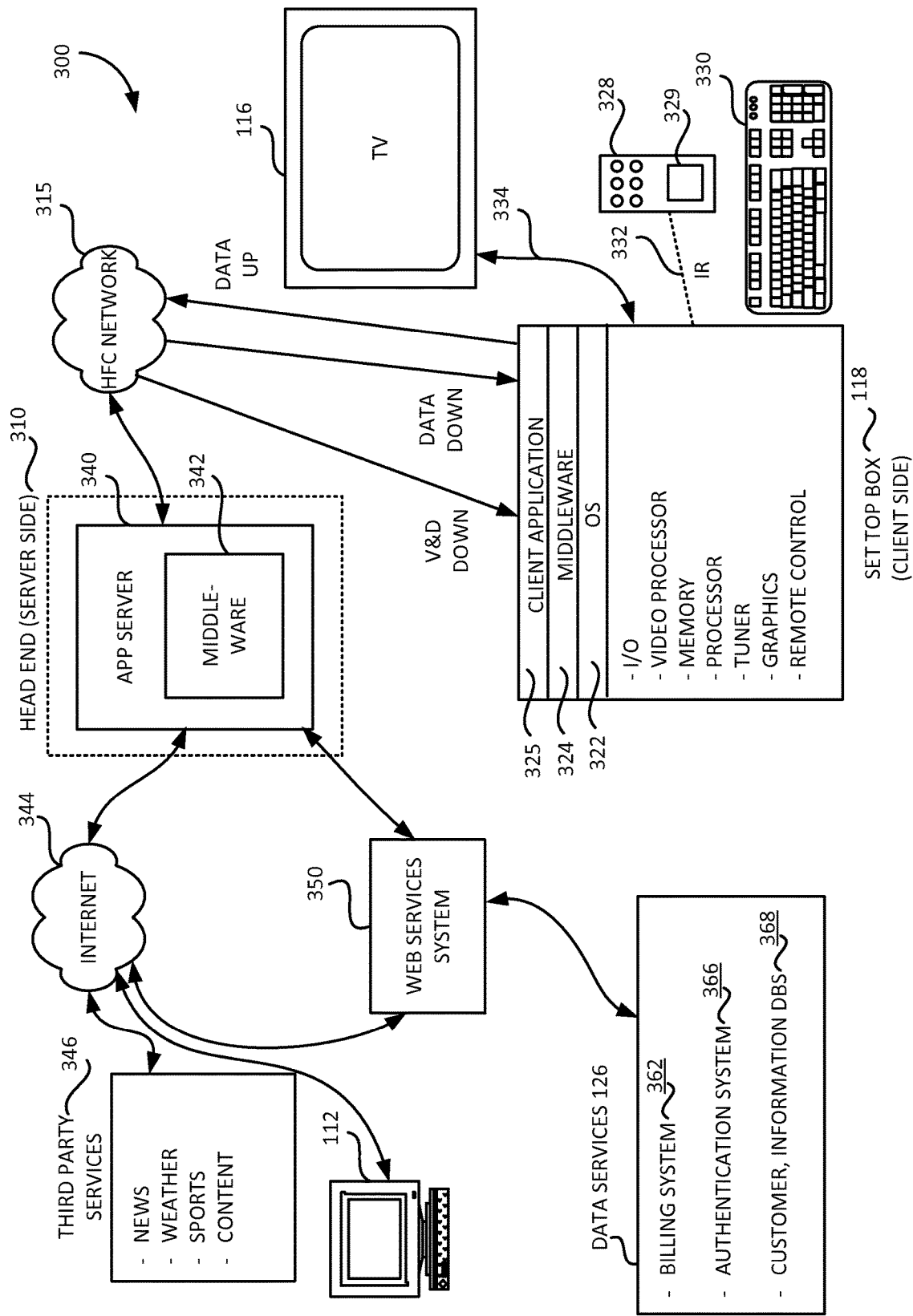
FIG. 3 is a simplified block diagram illustrating a cable television services system architecture providing an operating environment according to an embodiment.

FIG. 3 is a block diagram illustrating a cable television services system 300 (hereafter referred to as "CATV") architecture providing an operating environment according to an embodiment. As should be appreciated, a CATV services system 300 is but one of various types of systems that may be utilized for providing an operating environment for providing editing and changing of links of programs in real time. Referring now to FIG. 3, digital and analog video programming, information content and interactive television services are provided via a hybrid fiber coax (HFC) network 315 to a television set 116 for consumption by a cable television/services system customer. As is known to those skilled in the art, HFC networks 315 combine both optical fiber and coaxial cable lines. Typically, optical fiber runs from the cable head end 310 to neighborhoods of subscribers. Coaxial cable runs from the optical fiber feeders to each customer or subscriber. The functionality of the HFC network 315 allows for efficient bidirectional data flow between the client-side set-top box 118 and the server-side application server 340 of the embodiment.

The CATV system 300 is in the form of a distributed client-server computing system for providing video and data flow across the HFC network 315 between server-side services providers (e.g., cable television/services providers) via a server-side head end 310 and a client-side customer via a client-side set-top box (STB) 118 functionally connected to a customer receiving device, such as the television set 116. As is understood by those skilled in the art, modern CATV systems 300 may provide a variety of services across the HFC network 315 including traditional digital and analog video programming, telephone services, high speed Internet access, video-on-demand, and information services.

On the client side of the CATV system 300, digital and analog video programming and digital and analog data are provided to the customer television set 116 via the set-top box (STB) 118. Interactive television services that allow a customer to input data to the CATV system 300 likewise are provided by the STB 118. As illustrated in FIG. 3, the STB 118 is a multipurpose computing device having a computer processor, memory, and an input/output mechanism. The input/output mechanism receives input from server-side processes via the HFC network 315 and from customers via input devices such as the remote control device 328, keyboard 330, or other computing device 112, such as a tablet/slate computer 114, smart phone 110, etc. The remote control device 328 and the keyboard 330 may communicate with the STB 118 via a suitable communication transport such as the infrared connection 332. The remote control device 328 may include a biometric input module 329. The STB 118 also includes a video processor for processing and providing digital and analog video signaling to the television set 116 via a cable communication transport 334. A multi-channel tuner is provided for processing video and data to and from the STB 118 and the server-side head end system 310, described below.

The STB 118 also includes an operating system 322 for directing the functions of the STB 118 in conjunction with a variety of client applications 325. For example, if a client application 325 requires a news flash from a third-party news source to be displayed on the television 116, the operating system 322 may cause the graphics functionality and video processor of the STB 118, for example, to output the news flash to the television 116 at the direction of the client application 325 responsible for displaying news items.

Because a variety of different operating systems 322 may be utilized by a variety of different brands and types of set-top boxes, a middleware layer 324 may be provided to allow a given software application to be executed by a variety of different operating systems. According to an embodiment, the middleware layer 324 may include a set of application programming interfaces (APIs) that are exposed to client applications 325 and operating systems 322 that allow the client applications to communicate with the operating systems through common data calls understood via the API set. As described below, a corresponding middleware layer is included on the server side of the CATV system 300 for facilitating communication between the server-side application server and the client-side STB 118. The middleware layer 342 of the server-side application server and the middleware layer 324 of the client-side STB 118 may format data passed between the client side and server side according to the Extensible Markup Language (XML).

According to one embodiment, the set-top box 118 passes digital and analog video and data signaling to the television 116 via a one-way communication transport 334. According to other embodiments, two-way communication transports may be utilized, for example, via high definition multimedia (HDMI) ports. The STB 118 may receive video and data from the server side of the CATV system 300 via the HFC network 315 through a video/data downlink and data via a data downlink. The STB 118 may transmit data from the client side of the CATV system 300 to the server side of the CATV system 300 via the HFC network 315 via one data uplink. The video/data downlink is an "in band" downlink that allows for digital and analog video and data signaling from the server side of the CATV system 300 through the HFC network 315 to the set-top box 118 for use by the STB 118 and for distribution to the television set 116. As is understood by those skilled in the art, the "in band" signaling space operates at a relative high frequency, e.g., between 54 and 1000 megahertz. The signaling space is generally divided into 6 megahertz channels in which may be transmitted as a single analog signal or a greater number (e.g., ten) of digital signals.

The data downlink and the data uplink, illustrated in FIG. 3, between the HFC network 315 and the set-top box 118 comprise "out of band" data links. As is understand by those skilled in the art, the "out of band" frequency range is generally at a lower frequency than "in band" signaling. For example, the "out of band" frequency range may be between zero and 54 megahertz. Data flow between the client-side set-top box 118 and the server-side application server 340 is typically passed through the "out of band" data links. Alternatively, an "in band" data carousel may be positioned in an "in band" channel into which a data feed may be processed from the server-side application server 340 through the HFC network 315 to the client-side STB 118. Operation of data transport between components of the CATV system 300, described with reference to FIG. 3, is well known to those skilled in the art.

Referring still to FIG. 3, the head end 310 of the CATV system 300 is positioned on the server side of the CATV system and includes hardware and software systems responsible for originating and managing content for distributing through the HFC network 315 to client-side STBs 118 for presentation to customers via televisions 116. As described above, a number of services may be provided by the CATV system 300, including digital and analog video programming, interactive television services, telephone services, video-on-demand services, targeted advertising, and provision of information content.

The application server 340 is a general-purpose computing system operative to assemble and manage data sent to and received from the client-side set-top box 118 via the HFC network 315. As described above with reference to the set-top box 118, the application server 340 includes a middleware layer 342 for processing and preparing data from the head end of the CATV system 300 for receipt and use by the client-side set-top box 118. For example, the application server 340 via the middleware layer 342 may obtain data from third-party services 346 via the Internet 344 for transmitting to a customer through the HFC network 315 and the set-top box 118. For example, content metadata a third-party content provider service may be downloaded by the application server via the Internet 344. When the application server 340 receives the downloaded content metadata, the middleware layer 342 may be utilized to format the content metadata for receipt and use by the set-top box 118. Therefore, content metadata may be sent and categorized based on the availability to the customer's program guide data.

According to one embodiment, data obtained and managed by the middleware layer 342 of the application server 340 is formatted according to the Extensible Markup Language and is passed to the set-top box 118 through the HFC network 315 where the XML-formatted data may be utilized by a client application 325 in concert with the middleware layer 324, as described above. As should be appreciated by those skilled in the art, a variety of third-party services data, including news data, weather data, sports data and other information content may be obtained by the application server 340 via distributed computing environments such as the Internet 344 for provision to customers via the HFC network 315 and the set-top box 118. According to embodiments, client application 340 may include the client application 108 described herein.

According to embodiments, the application server 340 obtains customer support services data, including billing data, information on customer work order status, answers to frequently asked questions, services provider contact information, and the like from data services 126 for provision to the customer via an interactive television session. As illustrated in FIG. 3, the services provider data services 126 include a number of services operated by the services provider of the CATV system 300 which may include data on a given customer.

A billing system 362 may include information such as a customer's name, street address, business identification number, Social Security number, credit history, and information regarding services and products subscribed to by the customer. According to embodiments, the billing system 362 may also include billing data for services and products subscribed to by the customer for bill processing, billing presentment and payment receipt.

A customer information database 368 may include general information about customers such as place of employment, business address, business telephone number, and demographic information such as age, gender, educational level, and the like. The customer information database 368 may also include information on pending work orders for services or products ordered by the customer. The customer information database 368 may also include general customer information such as answers to frequently asked customer questions and contact information for various service provider offices/departments. As should be understood, this information may be stored in a variety of disparate databases operated by the cable services provider.

Referring still to FIG. 3, web services system 350 is illustrated between the application server 340 and the data services 126. According to embodiments, web services system 350 serves as a collection point for data requested from each of the disparate data services systems comprising the data services 126. According to embodiments, when the application server 340 requires customer services data from one or more of the data services 126, the application server 340 passes a data query to the web services system 350. The web services system formulates a data query to each of the available data services systems for obtaining any required data for a requesting customer as identified by a set-top box identification associated with the customer. The web services system 350 serves as an abstraction layer between the various data services systems and the application server 340. That is, the application server 340 is not required to communicate with the disparate data services systems, nor is the application server 340 required to understand the data structures or data types utilized by the disparate data services systems. The web services system 350 is operative to communicate with each of the disparate data services systems for obtaining necessary customer data. The customer data obtained by the web services system is assembled and is returned to the application server 340 for ultimate processing via the middleware layer 342, as described above.

An authentication system 366 may include information such as secure user names, subscriber profiles, subscriber IDs, and passwords utilized by customers for access to network services. As should be understood by those skilled in the art, the disparate systems 350, 362, 366, 368 may be integrated or provided in any combination of separate systems, wherein FIG. 3 shows only one example.

Figure 4:
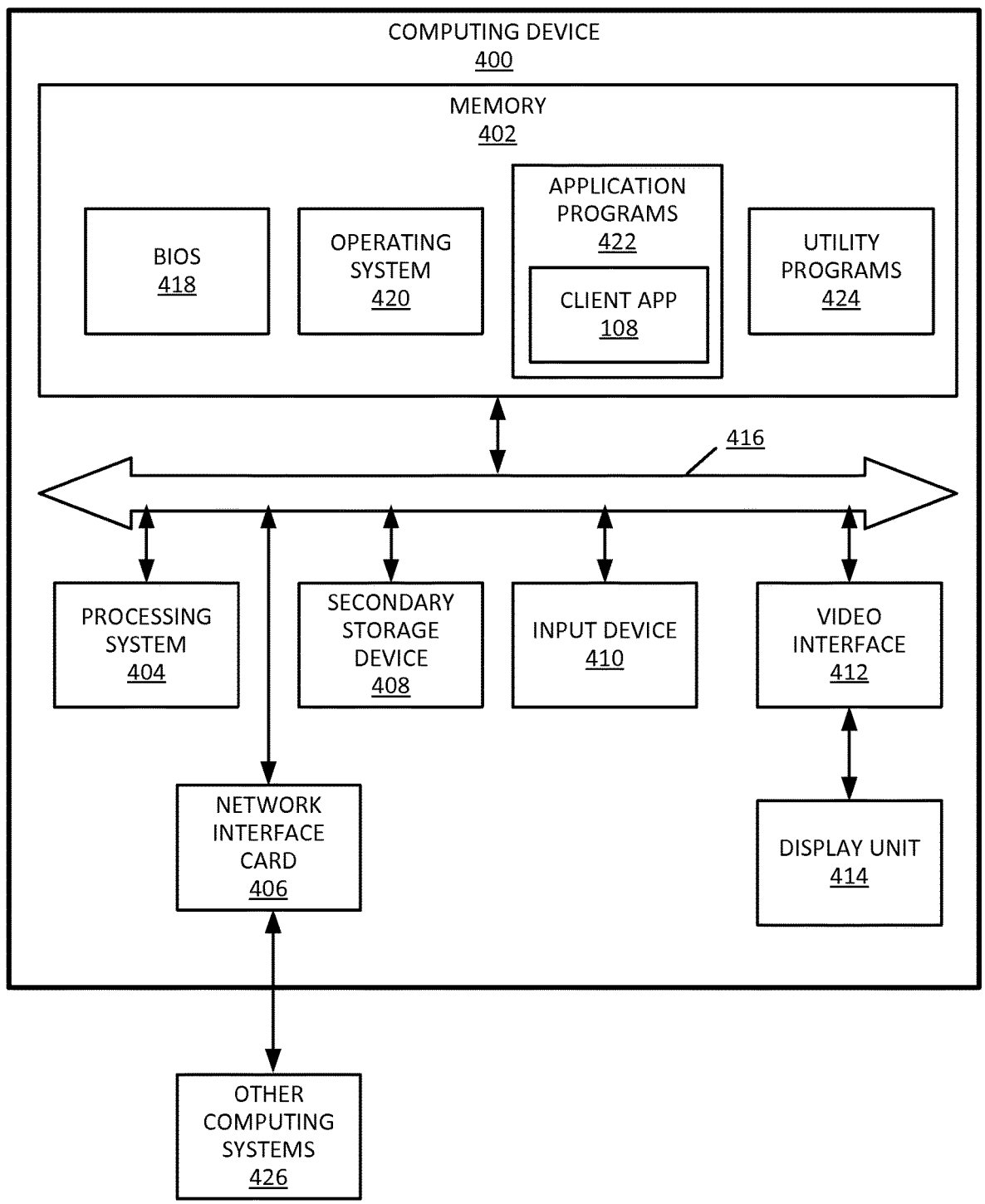
FIG. 4 is a simplified block diagram illustrating example physical components of a computing device with which embodiments may be practiced.

FIG. 4 is a block diagram illustrating example physical components of a computing device 400 with which embodiments may be practiced. In some embodiments, one or a combination of the components 108,110,112,114,116,118, 120,122,124,126 of system 100 may be implemented using one or more computing devices like the computing device 400. It should be appreciated that in other embodiments, components 108, 110, 112, 114, 116, 118, 120, 122, 124, 126 of system 100 may be implemented using computing devices having hardware components other than those illustrated in the example of FIG. 4.

Computing devices may be implemented in different ways in different embodiments. For instance, in the example of FIG. 4, the computing device 400 includes a processing system 404, memory 402, a network interface 406, a secondary storage device 408, an input device 410, a video interface 412, a display unit 414, and a communication medium 416. In other embodiments, the computing device 400 may be implemented using more or fewer hardware components (e.g., a video interface, a display unit, or an input device) or in combination with other types of computer systems and program modules 426.

The memory 402 includes one or more computer-readable storage media capable of storing data and/or computer-executable instructions. According to one embodiment, the client application 108 may be stored locally on computing device 400. Memory 402 thus may store the computer-executable instructions that, when executed by processor 404, cause the client application 108 to allow users to allows the user to access the protected additional content items seamlessly without going through the hassle of entering their credentials, every time they change channels and try to access protected additional content items associated with the video content items as described above with reference to FIGS. 1 and 2.

In various embodiments, the memory 402 is implemented in various ways. For example, the memory 402 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 404 includes one or more processing units, which may include tangible integrated circuits that selectively execute computer-executable instructions. In various embodiments, the processing units in the processing system 404 are implemented in various ways. For example, the processing units in the processing system 404 can be implemented as one or more processing cores. In this example, the processing system 404 can comprise one or more Intel Core microprocessors. In another example, the processing system 404 can comprise one or more separate microprocessors. In yet another example embodiment, the processing system 404 can comprise Application-Specific Integrated Circuits (ASICs) that provide specific functionality. In yet another example, the processing system 404 provides specific functionality by using an ASIC and by executing computer-executable instructions.

The computing device 400 may be enabled to send data to and receive data from a communication network via a network interface card 406. In different embodiments, the network interface card 406 is implemented in different ways, such as an Ethernet interface, a token-ring network interface, a fiber optic network interface, a wireless network interface (e.g., Wi-Fi, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 408 includes one or more computer-readable storage media, and may store data and computer-executable instructions not directly accessible by the processing system 404. That is, the processing system 404 performs an I/O operation to retrieve data and/or computer-executable instructions from the secondary storage device 408. In various embodiments, the secondary storage device 408 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 410 enables the computing device 400 to receive input from a user. Example types of input devices include, but are not limited to, keyboards, mice, trackballs, stylus input devices, key pads, microphones, joysticks, touch-sensitive display screens, and other types of devices that provide user input to the computing device 400.

The video interface 412 outputs video information to the display unit 414. In different embodiments, the video interface 412 is implemented in different ways. For example, the video interface 412 is a video expansion card. In another example, the video interface 412 is integrated into a motherboard of the computing device 400. In various embodiments, the display unit 414 can be a an LCD display panel, a touch-sensitive display panel, an LED screen, a projector, a cathode-ray tube display, or another type of display unit. In various embodiments, the video interface 412 communicates with the display unit 414 in various ways. For example, the video interface 412 can communicate with the display unit 414 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 416 facilitates communication among the hardware components of the computing device 400. In different embodiments, the communications medium 416 facilitates communication among different components of the computing device 400. For instance, in the example of FIG. 4, the communications medium 416 facilitates communication among the memory 402, the processing system 404, the network interface card 406, the secondary storage device 408, the input device 410, and the video interface 412. In different embodiments, the communications medium 416 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 402 stores various types of data and/or software instructions. For instance, in the example of FIG. 4, the memory 402 stores a Basic Input/Output System (BIOS) 418, and an operating system 420. The BIOS 418 includes a set of software instructions that, when executed by the processing system 404, cause the computing device 400 to boot up. The operating system 420 includes a set of software instructions that, when executed by the processing system 404, cause the computing device 400 to provide an operating system that coordinates the activities and sharing of resources of the computing device 400. The memory 402 also stores one or more application programs 422 that, when executed by the processing system 404, cause the computing device 400 to provide applications to users, for example, the client application 108. The memory 402 also stores one or more utility programs 424 that, when executed by the processing system 404, cause the computing device 400 to provide utilities to other software programs.

Embodiments of the present invention may be utilized in various distributed computing environments where tasks are performed by remote processing devices that are linked through a communications network in a distributed computing environment.

FIGS. 5A-B illustrate a suitable mobile computing environment, for example, a mobile computing device 110, a smart phone, a tablet personal computer 114, a laptop computer 112, and the like, with which embodiments may be practiced. The mobile computing device 500 is illustrative of any suitable device operative to send, receive and process wireless communications according to embodiments of the present invention. A display screen 505 is operative for displaying a variety of information such as information about incoming and outgoing communications, as well as, a variety of data and displayable objects, for example, text, alphanumeric data, photographs, and the like.

Data input to the device 500 may be performed via a variety of suitable means, such as, touch screen input via the display screen 505, keyboard or keypad input via a data entry area 510, key input via one or more selectable buttons or controls 515, voice input via a microphone 518 disposed on the device 500, photographic input via a camera 525 functionality associated with the mobile computing device, or any other suitable input means. Data may be output via the device 500 via any suitable output means, including but not limited to, display on the display screen 505, audible output via an associated speaker 530 or connected earphone system, vibration module for providing tactile output, and the like.

Referring now to FIG. 5B, operational unit 535 is illustrative of internal operating functionality of the mobile computing device 500. A processor 540 is illustrative of a general purpose computer processor for processing incoming and outgoing data and communications and controlling operation of the device and associated software applications via a mobile computing device operating system. Memory 545 may be utilized for storing a device operating system, device programming, one or more stored applications, for example, mobile telephone applications, data processing applications, calculators, games, Internet browsing applications, navigation applications, acceleration applications, camera and/or video applications, etc. According to one embodiment, the client application 108 may be stored locally on mobile computing device 500.

Mobile computing device 500 may contain an accelerometer 555 for detecting acceleration, and can be used to sense orientation, vibration, and/or shock. Mobile computing device 500 may contain a global positioning system (GPS) system (e.g., GPS send/receive functionality) 560. A GPS system 560 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 550 include all required functionality, including onboard antennae, for allowing the device 500 to communicate with other communication devices and systems via a wireless network. Radio functions 550 may be utilized to communicate with a wireless or WIFI-based positioning system to determine a device's 500 location.

Although described herein in combination with mobile computing device 500, in alternative embodiments the invention may be used in combination with any number of computer systems, such as in desktop environments, laptop or notebook computer systems, multiprocessor systems, micro-processor based or programmable consumer electronics, networked PCs, mini computers, main frame computers and the like. Embodiments of the present invention may be utilized in various distributed computing environments where tasks are performed by remote processing devices that are linked through a communications network in a distributed computing environment, and where programs may be located in both local and remote memory storage.

Embodiments, for example, are described above with reference to block diagrams and/or operational illustrations of methods, systems, and computer program products according to embodiments. The functions/acts noted in the blocks may occur out of the order as shown in any flowchart or described herein with reference to FIGS. 1-5. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

We claim:

1. A method for authenticating access to additional content, the method comprising:
    receiving, at a first server, an indication of a user selection of an additional content item that is associated with a content item being viewed by the user, wherein the user is associated with a service provider account comprised of one or more other users;
    determining the additional content item is protected from access;
    determining the user does not have credentials for accessing the additional content item;
    obtaining, from a second server, a federated login credential established for the user that is unique from federated logins established for each of the one or more other users associated with the service provider account, the federated login credential providing login credentials authenticating rights to two or more content items from different content providers, at least one of the two or more content items being the additional content item;
    providing the federated login credential to a content provider of the additional content item to access the additional content; and
    providing the additional content item to the user.

2. The method of claim 1, wherein obtaining the federated login credential established for the user comprises obtaining:
    a generic login credential comprised of a user ID and password for accessing a protected additional content item requiring no payment; or
    a complex login credential comprised of a user ID and password and including payment information for accessing a protected additional content item requiring payment.

3. The method of claim 1, wherein determining the additional content item is protected from access comprises determining the additional content item requires access authentication from the user.

4. The method of claim 3, wherein determining the additional content item requires access authentication from the user includes parsing a metadata associated with the additional content item to determine access authentication is required from the user prior to allowing access to the additional content item.

5. The method of claim 1, wherein prior to providing the federated login credential to the content provider of the additional content item to access the additional content item, further comprising:
    providing an option for receiving a login credential from the user;
    receiving the login credential; and
    storing the received login credential as the federated login credential that is used for granting access to other protected additional content items to the user without requiring receipt of an additional login credential from the user when the user requests access to the other protected additional content items.

6. The method of claim 5, wherein:
    receiving the indication of the selection of the additional content item includes receiving the indication of the selection of the additional content item via a first viewing tuning channel; and
    wherein if a subsequent selection of the additional content item is received via a second viewing tuning channel, providing the federated login credential to the content provider of the additional content item to access the additional content item via the second viewing tuning channel without requiring additional login credentials from the user.

7. The method of claim 5, further comprising:
    receiving an indication of a selection of a second additional content item; and
    if the second additional content item is protected from access, providing the stored federated login credential to a provider of the second additional content item for allowing the user access to the second additional content item.

8. The method of claim 1, wherein prior to receiving the indication of the selection of the additional content item, providing an indication of availability of the additional content item.

9. The method of claim 8, wherein providing the indication of availability of the additional content item includes providing a selectable link to the additional content item in association with a being-viewed content item.

10. The method of claim 1, wherein prior to providing the additional content item, determining whether access to the additional content item by the user is restricted according to one or more access restrictions.

11. The method of claim 10, wherein prior to providing the additional content item, determining whether access to the additional content item by the user is restricted according to a parental control associated with the additional content item that restricts access to the additional content item by the user.

12. The method of claim 1, wherein providing the additional content item includes providing an Internet-based website containing the additional content item.

13. A system for providing access to additional content, the system comprising:
    a memory storage; and
    a processing unit coupled to the memory storage, wherein the processing unit is operable to:
        receive an indication of a user selection of an additional content item that is associated with a content item being viewed by the user, wherein the user is associated with a service provider account comprised of one or more other users;

determine access to the additional content item is protected;

determine the user is not authorized to access the additional content item;

obtain a federated login credential established for the user that is unique from federated logins established for each of the one or more other users associated with the service provider account, the federated login credential authorizing access to two or more content items including the additional content item across a plurality of channels via which the additional content item can be accessed, at least two of the two or more content items being from different content providers;

provide the federated login credential to a content provider of the additional content item to access the additional content; and provide the additional content item to the user.

14. The system of claim 13, wherein prior to providing the federated login credential to the content provider of the additional content item, the processing unit is further operable to:

provide an option for receiving a login credential from the user;

receive the login credential; and store the received login credential as the federated login credential that may be used for granting access to other protected additional content items to the user without requiring receipt of an additional login credential from the user when the user requests access to the other protected additional content items.

15. The system of claim 14, wherein the processing unit is further operable to receive from the user:

a generic login credential comprised of a user ID and password for accessing a protected additional content item requiring no payment; or a complex login credential comprised of a user ID and password and including payment information for accessing a protected additional content item requiring payment.

16. The system of claim 13, wherein the processing unit is further operable to:

determine access to the additional content item is protected by parsing a metadata associated with the additional content item to determine whether access authentication is required from the user prior to allowing access to the additional content item.

17. The system of claim 13, wherein the processing unit is further operable to:

receive the indication of the selection of the additional content item via a first viewing tuning channel; and provide the federated login credential for the user for accessing the additional content item via a second viewing tuning channel without requiring additional login credentials from the user if a subsequent selection of the additional content item is received via the second viewing tuning channel.

18. The system of claim 13, wherein the processing unit is further operable to:

receive an indication of a selection of a second additional content item; and if the second additional content item is protected from access, provide the federated login credential to a provider of the second additional content item for allowing the user access to the second additional content item.

19. The system of claim 13, wherein the processing unit to determine the access to the additional content item is protected determines whether access to the additional content item by the user is restricted according to one or more access restrictions.

20. A computer readable storage medium containing non-transitory computer executable instructions which when executed by a computer perform a method for authenticating access to additional content, the method comprising:

receiving, at a first server, an indication of a selection of an additional content item that is associated with a content item being viewed by the user, wherein the user is associated with a service provider account comprised of one or more other users;

determining the additional content item is protected from access;

determining the user does not have credentials for accessing the additional content item;

obtaining, from a second server, a federated login credential established for the user that is unique from federated logins established for each of the one or more other users associated with the service provider account, the federated login credential authenticating rights to two or more content items from different content providers, at least one of the two or more content items being the additional content item;

providing the federated login credential for the user to a content provider of the additional content item for accessing the additional content item; and providing the additional content item to the user.

* * * * *